Patented Mar. 27, 1934

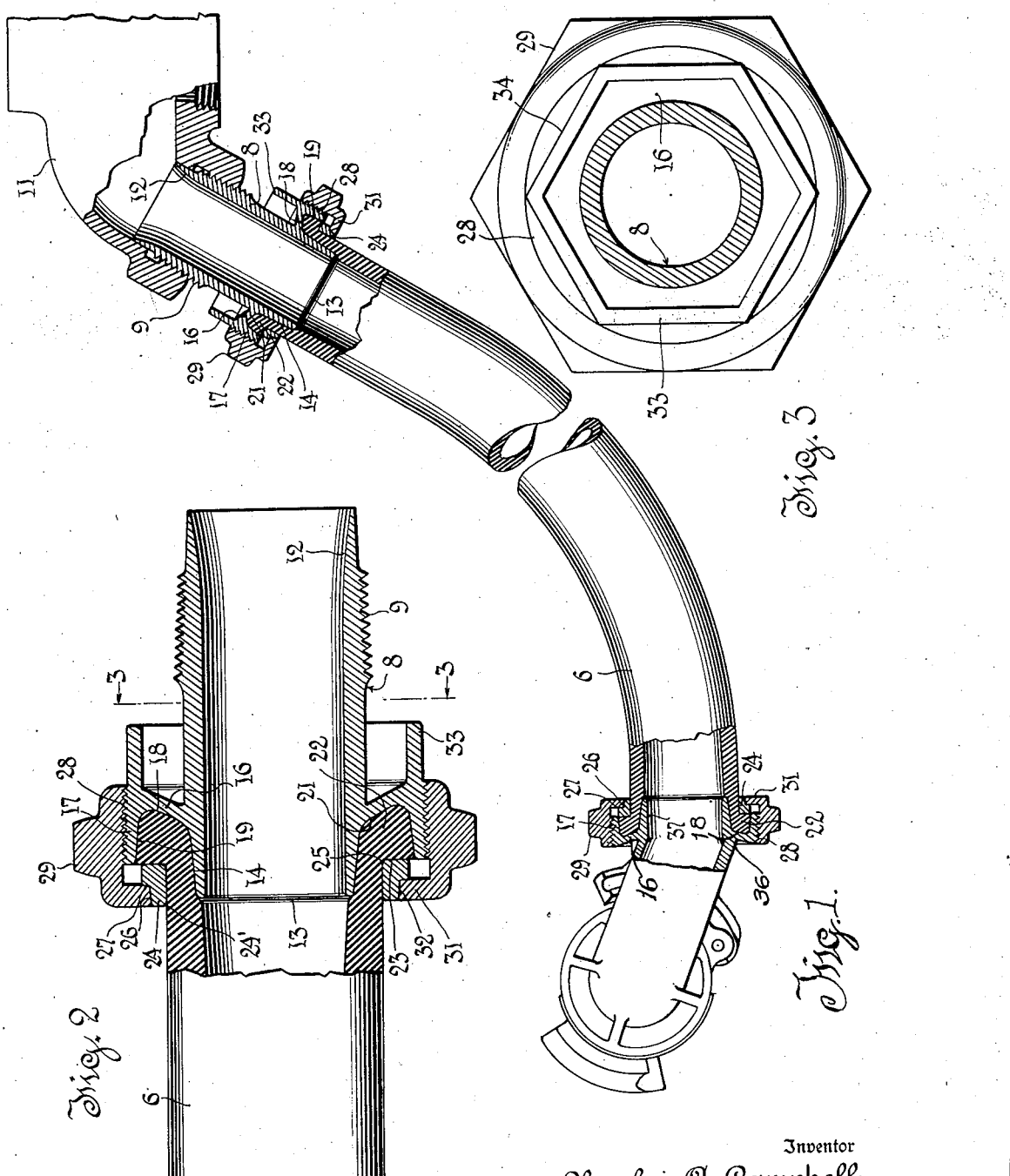

1,952,531

UNITED STATES PATENT OFFICE 1,952,531

HOSE CONNECTION

Charles Albert Campbell, Watertown, N. Y., assignor to The New York Air Brake Company, a corporation of New Jersey Application May 11, 1932, Serial No. 610,680

7 Claims. (Cl. 285—86)

This invention pertains to air brakes, and more particularly to connections or couplings for mounting air brake hose sections in the brake line.

In air brake systems it is common practice to provide each end of the brake pipe which extends through the car with an angle cock or angle fitting. Into each angle fitting there is screwed a hose nipple to which the hose is secured by the usual type of hose clamp. The other end of the hose is connected to the hose coupling in a like manner by means of the same type of clamp. This hose unit is coupled to a similar hose unit on the adjoining car.

Because of the heavy pressure required to insert the nipple and coupling into the ends of the hose it is necessary to provide a special mounting device in the air brake shops for facilitating repairs to ruptured hoses. Special means also are required for tightly wrapping the hose clamp around the hose to enable the workman to insert the bolt in the hose clamp and tighten it into place. Should the hose nipple or coupling become defective for any reason, it is necessary to unscrew the nipple from the angle fitting and remove the complete unit to the shop before proper repairs can be made. With this procedure, a pipe connection is broken by removing the nipple and, when a new nipple is inserted in the angle fitting, it is not always possible to secure a tight seal between the threads. It is well known that, when pipe threads are once distorted, it is practically impossible to obtain a seal as effective as that of the original installation.

The object of the present invention is to provide means for readily mounting and dismounting the air brake hose, whereby the conventional hose clamps are dispensed with and, in changing the hose and coupling, it is not necessary to remove the nipple from the angle fitting, nor to disturb the threaded connection between these parts. A further object is the designing of the connections between the hose, the nipple and the coupling, so that the hose may be connected to or disconnected from these members without the necessity of removing the unit to the repair shop or of using special tools or equipment for the purpose.

An important feature of the improved connection or joint between the hose and the nipple and the hose and the coupling is the facility with which the air brake hose may be connected to the metal fittings and the effectiveness of the air seals thereby established between the interconnected parts.

A further feature is that the special form of the air brake hose does not interfere with its efficient use in connection with standard types of angle fittings, nipples, couplings and hose clamps. Other features and advantages will appear hereinafter.

A practical embodiment of the invention appears in the accompanying drawing, wherein:—

Fig. 1 is a side elevational view, partly in section, showing my improved means for connecting the air brake hose in the brake line;

Fig. 2, an enlarged side view, partly in section, disclosing the details of construction of the connection between the hose and the angle fitting nipple; and Fig. 3, a section on line 3—3 of Fig. 2, which shows further details of the hose and nipple connection.

In the drawing, 6 represents an air brake hose, generally of rubber or rubber and fabric, to the lower end of which is secured a brake pipe coupling 7. The upper end of hose 6 connects with a metal nipple 8 threaded at 9 into the usual angle fitting or angle cock 11. The upper end of nipple 8 is flared internally at 12 to reduce the resistance to air flow therethrough as much as possible.

The details of the connection between hose 6 and nipple 8 appear most clearly in Fig. 2 because of the enlarged showing of the parts. Here it will be noted that adjacent its lower or left end 13 the nipple is tapered externally at 14 to provide for a light press fit of the nipple within the end of the hose. At the inner end of tapered portion 14 the nipple is formed with a circumferential, dished flange 16.

At its periphery flange 16 is extended to the left in the form of an annular portion 17. Portion 17 is spaced from the body of nipple 8 and thereby provides an annular groove or recess 18 to receive the adjoining end of the hose. The inner surface 19 of annular portion 17 is tapered inwardly towards the bottom 21 of groove 18. This, taken in conjunction with taper 14 on the nipple body, serves to render groove 18 of tapering form in longitudinal section, as appears clearly in Fig. 2. In addition, because of the dished form of flange 16, the bottom 21 of groove 18 is inclined, thereby providing an annular, abruptly-tapered surface into which the gradually tapered portion 14 of the nipple merges. The purposes of these features will appear shortly.

The upper or right-hand end of hose 6 is provided on its periphery with an annular enlarged bead or flange 22, which, when the connection with nipple 8 is completed as shown in the drawing, is tightly compressed into the annular groove or socket 18. Bead 22 is made integrally with the molded rubber hose and forms thereon an annular shoulder 23. Located on the hose and abutting shoulder 23 is a split metallic compression ring 24. Ring 24 is formed with a tapered, circumferential reduced portion 26, thereby providing an annular shoulder 27 for a purpose now to be explained.

The periphery of annular portion 17 of the nipple is threaded at 28 to receive a union nut 29. Nut 29 has an inwardly projecting flange 31 the inner edge 32 of which is tapered and engages the annular tapered surface 26 on split ring 24. The inner side face of flange 31 engages shoulder 27 on ring 24 to move the split ring to the right and thereby force hose bead 22 into groove 18. The inner edges 24' and 25 of compression ring 24 are rounded slightly so that no sharp corners are brought into direct contact with the hose.

Flange 16 on the nipple is also extended to the right at its periphery to form a second portion 33 surrounding, but spaced from, the body of nipple 8. Nipple portion 33, as shown in Fig. 3, is formed to provide facets 34 adapted to be engaged by a wrench when removing or replacing nipple 8 in angle fitting 11, should this be desired. This skeleton or hollow construction considerably lightens the nipple casting as compared with one wherein the space between the body of the nipple and portion 33 is filled in to form a solid faceted portion.

In making the original connection between hose 6 and nipple 8, union nut 29 is slipped onto the hose over the flexible annular bead 22, the inner diameter of flange 31 being made approximately the same as the outer diameter of bead 22 to permit this. Split compression ring 24 is then placed on the hose with the annular reduced portion 26 thereof located between the hose and the inner edge of flange 31 of the nut, thereby securely holding the ring in place.

The upper end of the hose is then forced over the tapered end portion 14 of the nipple, the taper serving to spread the end of the hose and guide annular bead 22 into its annular sealing recess or socket 18 in the nipple. Nut 29 is now shifted to the right to engage the threaded portion 28 of the nipple. Upon tightening the nut, split compression ring 24 is moved to the right against hose bead 22, because of the engagement of the inner face of nut flange 31 with shoulder 27 on the ring and the simultaneous coaction of tapered surfaces 26 and 32 on these members. As a result, ring 24 draws hose 6 somewhat to the right, and forces bead 22 firmly into annular groove 18 on the nipple to form a tight air seal therewith.

It is important to note that with the described construction, the annular bead 22 on the hose is in continuous, circumferential, sealing engagement with nipple 8 both on the inside and outside of the bead; also that similar contact is effected between the outer edge of the bead or end of the hose and bottom 21 of groove 18. In fact, the sealing contact between the hose and nipple is unbroken from end 13 of the nipple within the hose, out and around the beaded end of the hose to the upper left-hand edge of bead 22, as appears from Fig. 2. In this manner there is provided an extended sealing area which precludes all possibility of leakage between the parts.

The effectiveness of annular groove 18 in coacting with bead 22 to form a seal is considerably enhanced by the tapered form given the groove. This serves to compress the bead 22 transversely and thereby insure its tight contact with the inner and outer walls of the groove as ring 24 forces the bead to the right. Sealing contact is further assured by the inclined bottom 21 of the groove 18 which serves to spread the hose end and compress bead 22 against the outer wall of the groove.

Additional compression of the end of the hose around the nipple to render the seal even more efficient takes place between nipple portion 14 and compression ring 24 as the ring moves to the right, due to the tapered shape of the portion 14 and the uniform internal diameter of the ring. Compression of hose 6 at this point is increased where the size of the hose is sufficiently large to cause engagement between tapered surfaces 26, 32 on split ring 24 and union nut 29, respectively, before nut flange 31 contacts with shoulder 27 on the ring. In this case, ring 24 will be slightly contracted to compress the hose end on nipple portion 14 as nut 29 is screwed up.

The connection between the opposite end of hose 6 and hose coupling 7 is to all intents and purposes the same as that at the angle cock end of the hose just described. The manner of assembly and adjustment is the same in both cases.

As appears from Fig. 1, the coupling end of the hose is also formed with an annular bead 22. This end of the hose is fitted onto a tubular extension 36 of the coupling, the outer end portion 37 of which is tapered for the purpose. Circumferential flange 16 on coupling extension 36 is extended to the right at its periphery to form an annular, externally-threaded portion 17 spaced from the body of coupling extension 36, thereby providing annular, tapered groove 18 into which hose bead 22 is compressed to form a tight seal between the parts. A split ring 24 and a union nut 29 serve to effect the desired compression and sealing, as explained above. Circumferential flange 16 on extension 36, it will be noted, is not extended at its opposite side, since there is no need of a faceted tool engaging portion 33, such as is provided on threaded nipple 8 at the opposite end of the hose.

With the connections described, if it is desired to change hose coupling 7, union nut 29 on the coupling extension is unscrewed so as to relieve the compressive action of ring 24 on bead 22. Nut 29 and ring 24 are then moved upwardly on the hose, whereupon coupling 7 can easily be removed and replaced with a new one. Should it be desirable to change hose 6, both union nuts 29, 29 are unscrewed from coupling 7 and nipple 8 and shifted along the hose. This leaves split rings 24, 24 free to be removed after which nuts 29, 29 may readily be drawn over end beads 22, 22 on the hose. A new hose unit may then be mounted in place, the fluid-tight connections with hose coupling 7 and nipple 8 being made as explained above.

Obviously the means for forming the connection at the upper end of the hose may be located, if desired, either directly on the angle fitting or on a part attached thereto other than nipple 8.

Use of the described beaded-end hose in connection with standard type couplings, nipples and angle fittings employing conventional hose clamps, is also contemplated. Bead 22 on the hose coacts with the standard hose clamp to obviate all possibility of the hose connection pulling apart and, in addition, provides for additional sealing area and more effective sealing coaction between the parts.

Various modifications in the structure above described are obviously possible, and are contemplated within the scope of the appended claims.

What is claimed is:—

1. A hose connection of the union type comprising a hose; a tubular metallic fitting on one end of which said hose is mounted, said end of the hose being formed with a permanent, annular peripheral bead and said fitting with an annular groove in which said bead is located; a split ring mounted on the hose; and a union nut adjustably mounted on the fitting for engagement with said ring to move the latter against the bead and thereby force the bead into contact with the opposed walls of the groove.

2. A hose connection comprising, in combination, a hose one end of which is provided with a permanent annular bead; a metallic fitting having a tubular portion on which said end of the hose is mounted, said fitting being provided with an annular groove in which the hose bead is located; and means on the metallic fitting for forcing the hose bead into the annular groove, said groove serving to engage the annular bead both internally and externally to furnish extended sealing contact between the parts.

3. The combination of claim 2 further characterized in that said annular groove is tapered axially whereby to compress said annular bead transversely as the bead is forced into place and thus increase the resistance to leakage between the bead and the groove.

4. The combination of claim 2 further characterized in that the bottom of said annular groove is tapered so as to spread the beaded end of the hose into tight contact with the outer wall of the groove and thereby increase the resistance to leakage between the bead and the groove.

5. A hose connection comprising a hose one end of which is formed with a permanent annular bead; a metallic fitting having a tubular portion on which said end of the hose is mounted, said fitting being provided with an annular groove in which said bead is located; a split annular member mounted on said end of the hose against the annular bead; and a second annular member adjustably mounted on the fitting for coaction with said split annular member to compress the bead in the annular groove, one of said annular members being formed with a tapered surface adapted for engagement by the other annular member to cause the split annular member to clamp said hose end on the tubular portion of the fitting.

6. A hose connection comprising a hose one end of which is formed with a permanent annular, peripheral bead; a metallic fitting having a tubular portion on which said end of the hose is mounted, the fitting also being provided at the inner end of said tubular portion with an annular groove to receive the peripheral hose bead; and means on the fitting for compressing said bead into the groove to form an extended continuous sealing contact between the inner, outer and end surfaces of the bead and the opposed surfaces of the groove.

7. A hose connection comprising a hose one end of which is formed with a permanent, annular peripheral bead; a metallic fitting having a tapered tubular portion on which said end of the hose is mounted, the fitting also being provided at the inner end of said tubular portion with an annular, externally threaded enlargement which, with said tubular portion, forms an annular groove to receive the peripheral hose bead; and means, including a split ring on the hose and a union nut adjustably mounted on the annular enlargement, for compressing said bead into the groove to form an extended, continuous sealing contact between the inner, outer and end surfaces of the bead and the opposed surfaces of the groove.

CHARLES ALBERT CAMPBELL.